United States Patent
Yamada et al.

(10) Patent No.: US 10,343,564 B2
(45) Date of Patent: Jul. 9, 2019

(54) VEHICLE SEAT

(71) Applicants: TS TECH CO., LTD., Saitama (JP); HONDA MOTOR CO., LTD., Tokyo (JP)

(72) Inventors: Takuro Yamada, Tochigi (JP); Yushiro Tachibana, Wako (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 15/723,519

(22) Filed: Oct. 3, 2017

(65) Prior Publication Data
US 2018/0126878 A1 May 10, 2018

(30) Foreign Application Priority Data
Nov. 9, 2016 (JP) .................. 2016-218660

(51) Int. Cl.
*B60N 2/08* (2006.01)
*B60N 2/427* (2006.01)
*B60N 2/42* (2006.01)

(52) U.S. Cl.
CPC ........... *B60N 2/42709* (2013.01); *B60N 2/43* (2013.01); *B60N 2/08* (2013.01)

(58) Field of Classification Search
CPC ............................. B60N 2/42709; B60N 2/43
USPC .......................................... 297/216.1, 216.2
See application file for complete search history.

(56) References Cited

U.S. PATENT DOCUMENTS

| | | | | |
|---|---|---|---|---|
| 2007/0273186 A1* | 11/2007 | Kurita | ................... | B60N 2/015 297/216.1 |
| 2014/0265470 A1* | 9/2014 | Suzuki | ................ | B60N 2/1615 297/216.1 |
| 2014/0339863 A1* | 11/2014 | Eckhoff | ............... | B60N 2/4228 297/216.1 |

FOREIGN PATENT DOCUMENTS

| | | |
|---|---|---|
| JP | S6310978 Y2 | 4/1988 |
| JP | H05254362 A | 10/1993 |
| JP | 2005225386 A | 8/2005 |
| JP | 2008265695 A | 11/2008 |
| JP | 2010105533 A | 5/2010 |
| WO | 2014064849 A | 5/2014 |

OTHER PUBLICATIONS

Japanese Office Action issued in Japanese Patent Application No. 2016-218660, dated May 22, 2018.

* cited by examiner

*Primary Examiner* — Syed A Islam
(74) *Attorney, Agent, or Firm* — Armstrong Teasdale LLP

(57) ABSTRACT

In a vehicle seat including an upper rail, a lower rails, a lock mechanism for normally locking the upper rail relative to the lower rail, and a lock release member for selectively unlocking the upper rail relative to the lower rail, a deformation restraining member is fixedly attached to the lower rail, and extends toward a part of the lower rail so as to define a small gap relative to the lower rail.

17 Claims, 5 Drawing Sheets out ← → in

VEHICLE SEAT

TECHNICAL FIELD

The present invention relates to a vehicle seat provided with a seat slide mechanism which is resistant to excessive deformation at the time of a vehicle crash.

BACKGROUND ART

A vehicle seat is typically provided with a pair of lower rails supported on a floor of a vehicle body so as to extend in the fore and aft direction in parallel to each other, a pair of upper rails engaged by the respective lower rails for slide motion in the lengthwise direction thereof, a seat cushion attached to the upper rails, a seat back connected to a rear end part of the seat cushion, a lock mechanism for normally securing the upper rails relative to the lower rails at desired positions of the seat cushion, and a lock release lever for manually and selectively releasing the locked state of the lock mechanism. See JP2005-225386A and JP2008-265695A, for instance.

As the lower rails support the seat, it is important that the lower rails are able to withstand the loading caused by a vehicle crash in order to ensure the safety of the vehicle occupant at the time of the vehicle crash. However, using thicker and more massive material for the lower rails leads to an excessive increase in the weight thereof, and this is detrimental to the fuel economy of the vehicle.

SUMMARY OF THE INVENTION

In view of such a problem of the prior art, a primary object of the present invention is to provide a vehicle seat including a seat slide mechanism which is protected from excessive deformation without requiring thick and/or massive component parts.

TASK TO BE ACCOMPLISHED BY THE INVENTION

The present invention achieves such an object by providing a vehicle seat, including: a lower rail (20) fixedly secured to a floor of a vehicle; an upper rail (22) engaged by the lower rail so as to be slidable along a lengthwise direction; a seat cushion (S1) fixedly secured to the upper rail; a seat back (S2) connected to a rear end part of the seat cushion; a lock mechanism (34) for normally locking the upper rail relative to the lower rail; a lock release member (46) associated with the lock mechanism for selectively unlocking the upper rail relative to the lower rail; and a deformation restraining member (64, 66) fixedly attached to the lower rail or a frame (24) of the seat cushion, and extending toward a part of the lower rail or the upper rail so as to define a small gap (E) relative to the lower rail or the upper rail.

Thereby, the lower rail is prevented from deforming excessively at the time of a vehicle crash owing to the presence of the deformation restraining member. Further, because the part of the deformation restraining member defining the gap is not required to be welded or otherwise fixedly secured to the lower rail or the upper rail, the manufacturing process can be simplified. However, if desired, the part of the deformation restraining member may abut the lower rail or the upper rail without departing from the spirit of the present invention.

According to a preferred embodiment of the present invention, the lower rail is fixedly attached to the floor via a bracket (58), and the deformation restraining member (64) includes a first part (64A, 64B) fixedly connected to the bracket, and a second part (64C) opposing a lower side of the lower rail.

Thereby, existing members such as the bracket may be used for securing the deformation restraining member so that the associated structure may be simplified, and usage of material can be minimized.

According to a particularly preferred embodiment of the present invention, the deformation restraining member is formed by bending a metallic rod, and the first part includes a pair of fore and aft pieces (64A, 64B) extending in a fore and aft direction and fixedly secured to the bracket at one ends thereof while the second part includes a lateral piece (64C) extending between other ends of the fore and aft pieces, the lateral piece being positioned adjacent to the lower side of the lower rail so as to define the small gap relative to the lower rail.

Thereby, the manufacturing process can be simplified, and a required stiffness and strength can be achieved at a minimum cost.

According to another aspect of the present invention, the deformation restraining member includes an upper section (66A) fixedly attached to the frame (24) of the seat cushion, and a lower section (66D) opposing an upper side of the upper rail.

This also provides an advantageous arrangement for preventing excessive deformation of the lower rail at the time of a vehicle crash.

Preferably, the lower section of the deformation restraining member opposes the lock release member in such a manner that the lower section prevents a lock releasing movement of the lock release member when the upper rail is deformed under a load of a vehicle crash.

Thereby, an inadvertent lock releasing movement of the lock release member can be avoided so that the safety of the vehicle occupant is enhanced.

Preferably, the deformation restraining member is formed by bending a metallic rod, and the upper section is formed by two terminal ends of the metallic rod while the lower section is formed by a semi-circular section of the metallic rod.

Thereby, the manufacturing process can be simplified, and a required stiffness and strength can be achieved at a minimum cost.

According to yet another aspect of the present invention, the vehicle seat further comprises an auxiliary deformation restraining member (68), the auxiliary deformation restraining member including a lower part (68A) fixedly attached to the lower rail, and an upper part (68C) opposing an intermediate section (66B, 66C) of the deformation restraining member from below.

This feature also contributes to the prevention of the excessive deformation of the lower rail at the time of a vehicle crash because the deformation of the lower rail is restrained by the abutting of the auxiliary deformation restraining member to the intermediate section of the deformation restraining member.

Preferably, the auxiliary deformation restraining member is made of stamp formed sheet metal. In this case, preferably, the lower part the auxiliary deformation restraining member includes a lower horizontal piece fixedly attached to a lower side of the lower rail, and the upper part the auxiliary deformation restraining member includes an upper horizontal piece, the auxiliary deformation restraining member further including an intermediate part (68B) extending along a lateral side of the lower rail.

Thereby, the manufacturing process can be simplified, and a required stiffness and strength can be achieved at a minimum cost.

Preferably, an intermediate section of the deformation restraining member is bent in a shape of letter U turned sideways in front view, and the upper horizontal piece of the auxiliary deformation restraining member opposes a lower side of the intermediate section of the deformation restraining member.

Thereby, an excessive deformation of the lower rail can be prevented by the abutting of the auxiliary deformation restraining member to the intermediate section of the deformation restraining member at the time of a vehicle crash.

BRIEF DESCRIPTION OF THE DRAWING(S)

DESCRIPTION OF THE PREFERRED EMBODIMENT(S)

A preferred embodiment of the present invention is described in the following with reference to the appended drawings.

Figure 1:
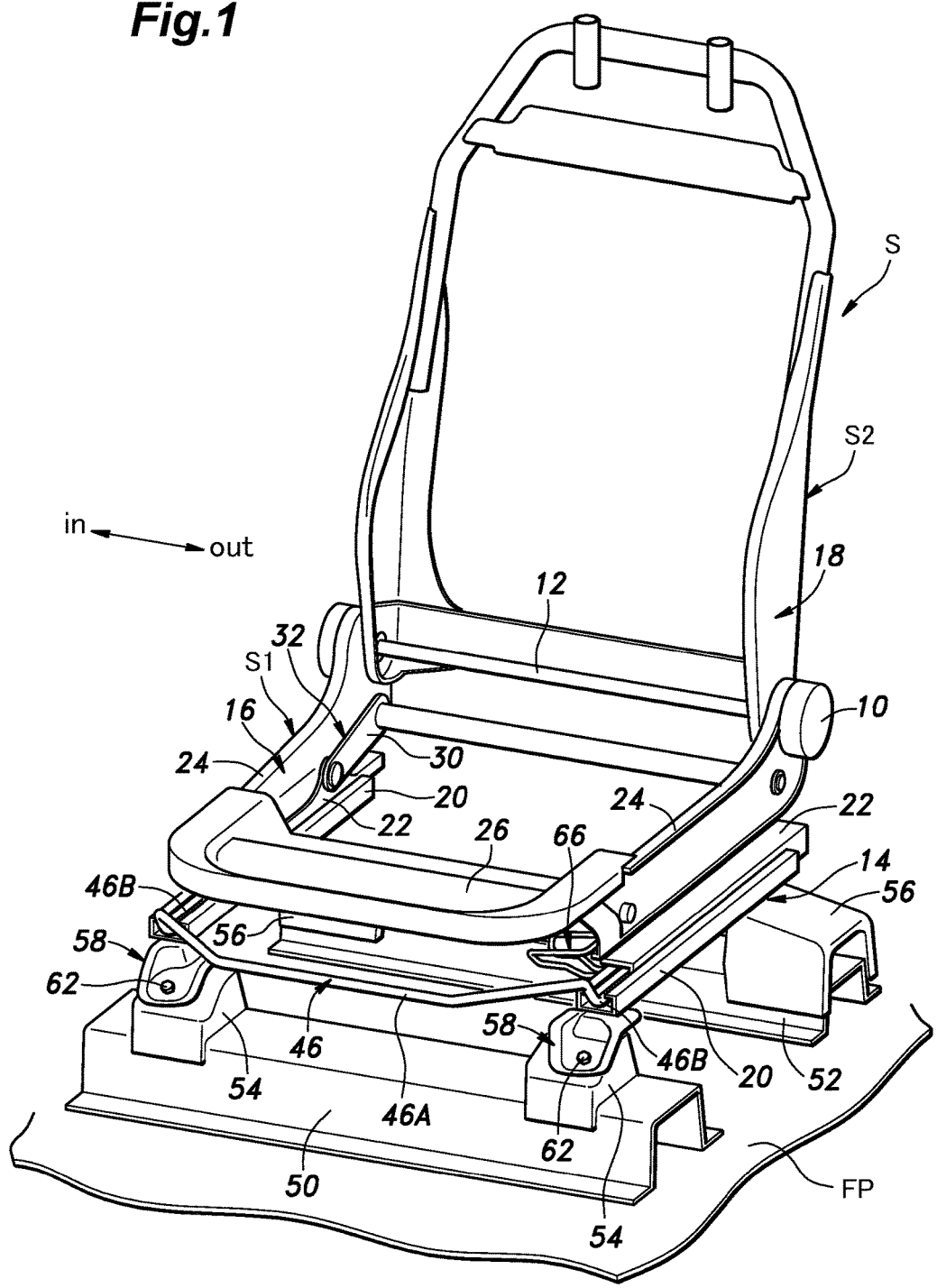
FIG. 1 is a perspective view of a frame of a (left hand side) vehicle seat according to an embodiment of the present invention.

As shown in FIG. 1, a vehicle seat S includes a seat cushion S1 defining a seat surface, and a seat back S2 pivotally connected to a rear end of the seat cushion S1 via a support shaft 12 of a reclining mechanism 10 and defining back rest surface. The seat cushion S1 is supported by a floor panel FP of the vehicle via a seat slide device 14 so as to be adjustable in the fore and aft direction.

The seat cushion S1 is provided with a seat cushion frame 16 made of steel material, and the seat cushion frame 16 is covered by a pad and a skin member (not shown in the drawings). The seat back S2 is provided with a seat back frame 18 made of steel material, and the seat back frame 18 is covered by a pad and a skin member (not shown in the drawings). The pad is made of a resilient cushion material such as polyurethane foam, and the skin member is made of sheet material such as leather, synthetic leather and fabric.

The seat slide device 14 includes a pair of lower rails 20 each consisting of a channel member extending in the fore and aft direction and having an upwardly facing open side, and a pair of upper rails 22 engaged by the respective lower rails 20 so as to be movable in the lengthwise direction of the lower rails 20. These seat rail sets extend along and under either side of the seat cushion frame 16 in parallel to each other.

The seat cushion frame 16 includes a pair of side members 24 extending along either side of the seat cushion frame 16, and a front member 26 connected between the front ends of the side members 24. Each side member 24 is connected to the corresponding upper rail 22 via a front link member 28 (FIG. 2) and a rear link member 30 so that a parallel link mechanism is formed when viewed from sideways. This parallel link mechanism forms a part of a lift mechanism 32 for adjusting the vertical position of the seat cushion S1. The lift mechanism 32 is provided with a fixing mechanism for selectively fixing the adjusted position of the seat cushion S1, but the fixing mechanism is of a per se known structure, and not shown in the drawings.

Figure 5:
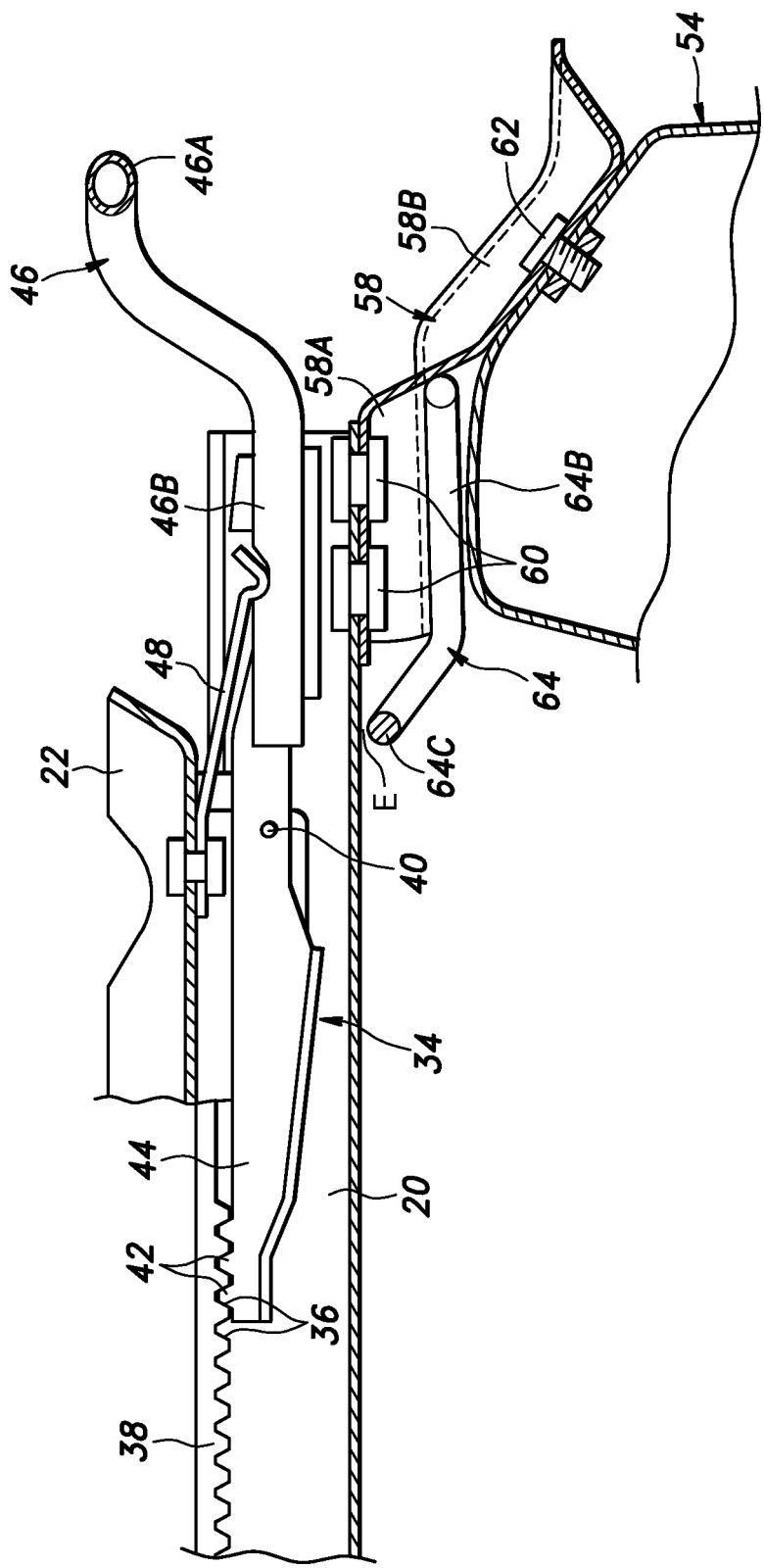
FIG. 5 is a fragmentary sectional right side view of a lock mechanism of the vehicle seat taken along a plane passing centrally through an upper and a lower seat rail.

As shown in FIG. 5, a lock mechanism 34 is provided between each lower rail 20 and the corresponding upper rail 22. As the seat is mostly symmetric with respect to a central plane of the seat, only one side of the seat may be described in the following as the other side is a mirror image of the one side. The lock mechanism 34 includes a rack 38 formed along the upper side of the lower rail 20 and provided with a plurality of downwardly projecting rack teeth 36, and a lever member 44 extending in the front and aft direction and pivotally connected to the upper rail 22 at an intermediate point thereof via a pivot pin 40 extending in the lateral direction. The rear end of the lever member 44 is provided with a plurality of upwardly projecting teeth 42 configured to cooperate with the rack teeth 36. Therefore, when the lever member 44 is tilted downward at the front end thereof, the rear end of the lever member 44 is raised upward so that the teeth 42 of the lever member 44 come into meshing engagement with the rack teeth 36.

The front ends of the lever members 44 positioned on either side of the seat cushion frame 16 are connected to each other via a lock release member 46 including a laterally extending cross piece 46A positioned in front of the seat cushion frame 16 and a pair of fore and aft pieces 46B extending rearward from either lateral end of the cross piece 46A. The rear ends of the fore and aft pieces 46B are connected to the front ends of the respective lever members 44. An intermediate point of each fore and aft piece 46B is engaged by a free end of a sheet spring 48 extending from a part of the corresponding upper rail 22 so that the lock release member 46 is normally urged downward.

When no operating force is applied to the lock release member 46, owing to the meshing between the teeth 42 of the lever member 44 with the rack teeth 36, each upper rail 22 is fixed in position relative to the corresponding lower rail 20. When the lock release member 46 is pulled upward, owing to the counterclockwise rotation of the lever member 44 in FIG. 5 against the spring force of the sheet spring 48, the teeth 42 of the lever member 44 are disengaged from the rack teeth 36 so that the upper rail 22 can be adjusted in position in the fore and aft direction relative to the lower rail 20. When the lock release member 46 is released after sliding the upper rail 22 relative to the lower rail 20 to a desired position, the upper rail 22 is locked relative to the lower rail 20 at the newly adjusted position.

The mounting structure of the lower rail 20 is now described in the following.

As shown in FIG. 1, a front cross member 50 and a rear cross member 52, each consisting of a flanged channel member with an open side thereof facing downward, are attached the floor panel FP one behind the other in a mutually parallel relationship. A pair of box-shaped front brackets 54 are attached to respective lateral end parts of the front cross member 50. Similarly, a pair of box-shaped rear brackets 56 are attached to respective lateral end parts of the rear cross member 52. Each front bracket 54 fixedly supports a front end part of the corresponding lower rail 20 via a mounting member 58, and the rear bracket 56 of the corresponding side fixedly and directly supports a rear end part of the corresponding lower rail 20.

The lower rails 20 both extend linearly in the fore and aft direction in parallel to each other, so do the upper rails 22. However, the lower rails 20 and the upper rails 22 may deform at the time of a vehicle crash under the loading of the vehicle crash, and it is important to control the deformation in appropriate manner in view of ensuring the safety of the vehicle occupant.

The seat frame structure is generally symmetric about a central plane extending in the fore and aft direction and in the vertical direction. Therefore, only the mounting structure for the seat rails on the outboard side (left hand side in FIG. 1) is described in the following with reference to FIGS. 2 to 5.

The mounting member 58 consists of a stamp formed sheet metal member elongated in the fore and aft direction, and includes a rear part 58A centrally provided with a convex upper surface and fixedly attached to the lower bottom surface of the front end of the lower rail 20 at the central part thereof by rivets 60, and a front part 58B centrally provided with a concave upper surface and fixedly secured to the front bracket 54 at the central part thereof via a threaded bolt 62. The mounting member 58 is provided with a flange 58C extending along the outer periphery of the mounting member 58 except for a rear edge thereof for reinforcement purpose.

Figure 3:
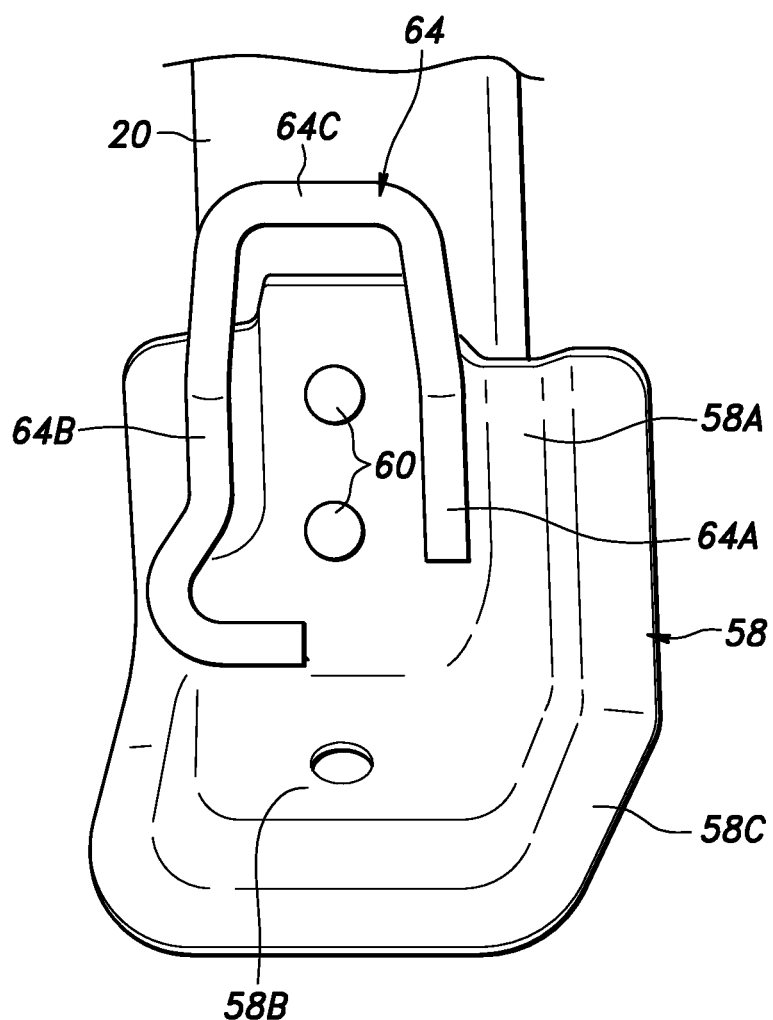
FIG. 3 is a fragmentary bottom view of a first restraining member of the vehicle seat.

A first deformation restraining member 64 is attached to the lower surface of the mounting member 58. As shown in FIG. 3, the first deformation restraining member 64 is formed by bending a steel rod into a substantially rectangular shape. The first deformation restraining member 64 includes a pair of longitudinal pieces 64A and 64B extending in the fore and aft direction in parallel to each other. The rear ends of the longitudinal pieces 64A and 64B are connected to each other via a lateral piece 64C. The front end of the inner longitudinal piece 64A terminates at an intermediate part of the mounting member 58 (with respect to the fore and aft direction), and the front end of the outer longitudinal piece 64B extends slightly beyond the front end of the inner longitudinal piece 64A (with respect to the fore and aft direction), and is bent toward the inner longitudinal piece 64A in the front end part thereof.

The inner longitudinal piece 64A is attached to the lower surface of an upwardly rising wall part of the rear part 58A of the mounting member 58, and the outer longitudinal piece 64B is attached to the lower surface of the peripheral flange 58C of the mounting member 58, typically by welding in each case. The bent front end of the outer longitudinal piece 64B is welded to a part of the lower surface of the front part 58B sloping downward ward toward the front.

Figure 2:
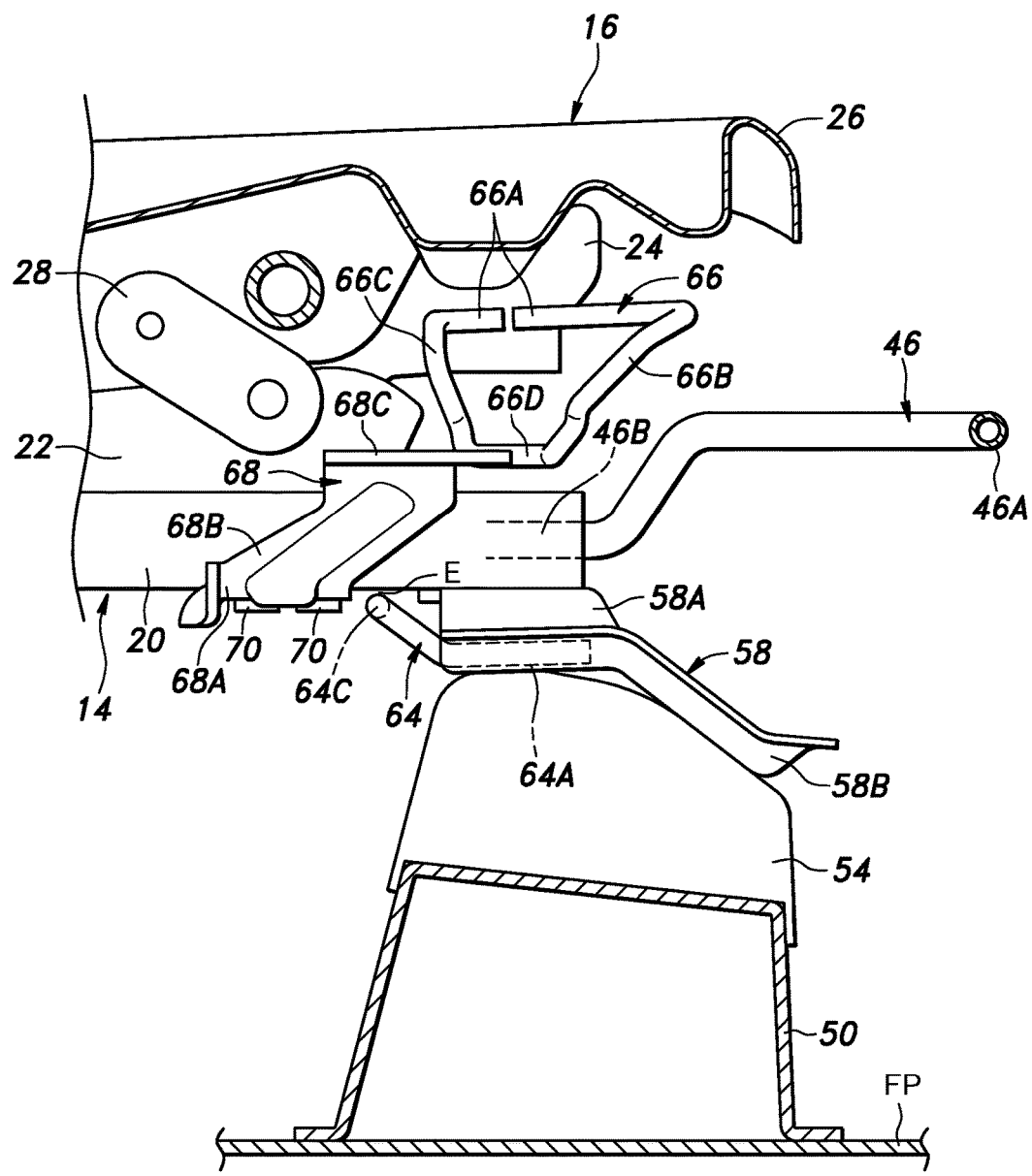
FIG. 2 is a fragmentary sectional right side view of a front part of the vehicle seat taken along a plane passing centrally through the seat.

Further, as shown in FIGS. 2 and 5, the rear end of the first deformation restraining member 64 is bent upward so as to define a small gap E with respect to the lower surface of the lower rail 20.

Because the rear end part of the first deformation restraining member 64 (in particular, the lateral piece 64C thereof) opposes the lower surface of the lower rail 20 via the small gap E, if the lower rail 20 should deform under a loading of a vehicle crash, the first deformation restraining member 64 restrains an excessive downward deformation of the lower rail 20.

Figure 4:
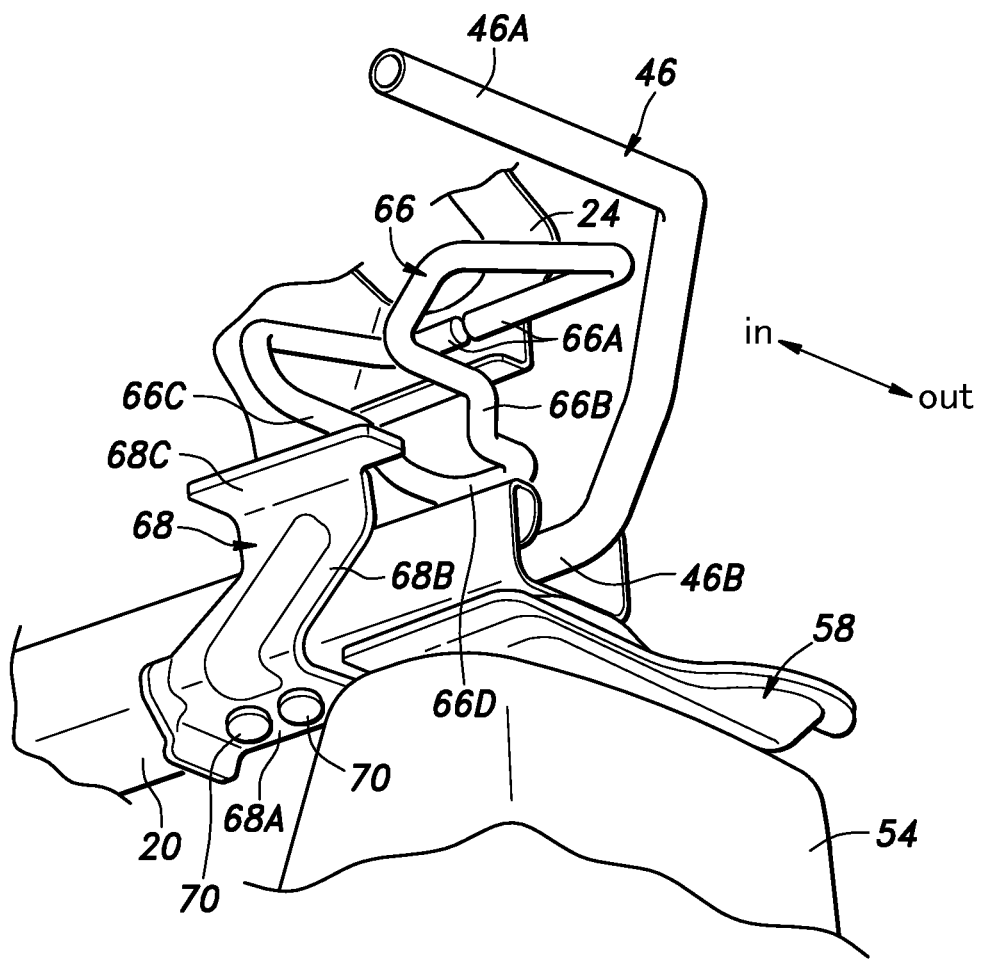
FIG. 4 is a fragmentary perspective view of a second restraining member of the vehicle seat as seen from a front right direction.

As best shown in FIG. 4, an unlock preventing member 66 is attached to the side member 24. The unlock preventing member 66 is formed by bending a steel rod member into an elliptic shape, and bending the elliptically shaped rod member along a minor diametric line thereof by somewhat more than 90 degrees so that a shape of letter U turned sideways in front view may be defined. Thus, the unlock preventing member 66 includes an upper section 66A formed as a linear section by the two terminal end parts of the rod member aligned with each other so as to extend in the fore and aft direction, and attached to the side member 24 by welding, a pair of intermediate sections 66B and 66C bent into the shape of letter U in front view (with the open side facing laterally outward with respect to the seat), and a lower section 66D formed as a semicircular section continuous with the intermediate sections 66B and 66C and defining a convex side facing outboard.

Thus, the lower section 66D of the unlock preventing member 66 opposes the upper surface of the lower rail 20 and in particular the upper surface of the lock release member 46 (in particular the corresponding fore and aft piece 46B thereof) via a small gap. The unlock preventing member 66 normally does not interfere with the motion of the lock release member 46 (as well as the motion of the upper rail 22). However, when the lower rail 20 or any other associated components should deform under a loading of a vehicle crash, the unlock preventing member 66 prevents any inadvertent movement of the lock release member 46 in the direction to release the lock mechanism 34 provided between the lower rail 20 and the upper rail 22.

A second deformation restraining member 68 is attached to a front end part of the lower rail 20. As best shown in FIG. 4, the second deformation restraining member 68 is made by stamp forming sheet metal, and includes a lower piece 68A extending horizontally and fixedly secured to the bottom surface of the lower rail 20 by rivets 70, a vertical piece 68B extending vertically from the lower piece 68A along the inner side of the lower rail 20 (in parallel thereto), and an upper piece 68C bent inward from the upper end of the vertical piece 68B into a horizontal orientation. The lower piece 68A and the vertical piece 68B may be formed with beads for reinforcement purpose.

The upper piece 68C opposes the intermediate sections 66B of the unlock preventing member 66 from below via a certain gap. The upper piece 68C is positioned so as not to interfere with the upper rail 22 or any other moveable parts of the seat, but may come into contact with the intermediate sections 66B of the unlock preventing member 66 if the lower rail 20 should deform under a loading of a vehicle crash. Thereby, any excessive deformation of the lower rail 20 can be prevented even at the time of a vehicle crash owing to the cooperation between the second deformation restraining member 68 and the unlock preventing member 66.

Although the present invention has been described in terms of a preferred embodiment thereof, it is obvious to a person skilled in the art that various alterations and modifications are possible without departing from the scope of the present invention.

The invention claimed is:

1. A vehicle seat, including:
    a lower rail fixedly secured to a floor of a vehicle;
    an upper rail engaged by the lower rail so as to be slidable along a lengthwise direction;
    a seat cushion fixedly secured to the upper rail;
    a seat back connected to a rear end part of the seat cushion;
    a lock mechanism for normally locking the upper rail relative to the lower rail;
    a lock release member associated with the lock mechanism for selectively unlocking the upper rail relative to the lower rail; and a deformation restraining member fixedly attached to the lower rail or a frame of the seat cushion, and extending toward a part of the lower rail or the upper rail so as to define a small gap relative to the lower rail or the upper rail, wherein the deformation restraining member includes an upper section fixedly attached to the frame of the seat cushion, and a lower section opposing an upper side of the lower rail, and wherein the lower section of the deformation restraining member opposes the lock release member in such a manner that the lower section prevents a lock releasing movement of the lock release member when the lower rail is deformed under a load of a vehicle crash.

2. The vehicle seat according to claim 1, wherein the deformation restraining member is formed by bending a metallic rod, and the upper section is formed by two terminal ends of the metallic rod while the lower section is formed by a semi-circular section of the metallic rod.

3. The vehicle seat according to claim 1, further comprising an auxiliary deformation restraining member, the auxiliary deformation restraining member including a lower part fixedly attached to the lower rail, and an upper part opposing an intermediate section of the deformation restraining member from below.

4. The vehicle seat according to claim 3, wherein the auxiliary deformation restraining member is made of stamp formed sheet metal, and wherein the lower part of the auxiliary deformation restraining member includes a lower horizontal piece fixedly attached to a lower side of the lower rail, and the upper part of the auxiliary deformation restraining member includes an upper horizontal piece, the auxiliary deformation restraining member further including an intermediate part extending along a lateral side of the lower rail.

5. The vehicle seat according to claim 3, wherein an intermediate section of the deformation restraining member is bent in a shape of letter U turned sideways in front view, and the upper horizontal piece of the auxiliary deformation restraining member opposes a lower side of the intermediate section of the deformation restraining member.

6. A vehicle seat, comprising:
a lower rail having an end fixedly secured to a bracket fixed to a floor of a vehicle;
an upper rail movably engaged by the lower rail;
a seat cushion connected to the upper rail;
a seat back connected to the seat cushion;
a lock mechanism including an engaging member provided on a side of the lower rail and an engaged member provided on a side of the upper rail, such that the lock mechanism locks the upper rail relative to the lower rail at a desired movement position by releasably engaging the engaging member with the engaged member;
a lock release member connected to the engaged member for unlocking operation to release the engaged member from engagement with the engaging member; and
a deformation restraining member provided so as to be capable of abutting the lower rail such that the deformation restraining member restrains downward deformation of the lower rail by abutting the lower rail,
wherein the deformation restraining member is arranged to overlap with the lock release member as viewed in a vertical direction, and
wherein the deformation restraining member is fixedly attached to the lower rail and extends obliquely upward toward a part of the lower rail so as to define a small gap relative to a lower surface of the lower rail.

7. The vehicle seat according to claim 6, further comprising:
an unlock preventing member including an upper section fixedly attached to the frame of the seat cushion, and a lower section opposing an upper side of the lower rail, wherein the lower section of the unlock preventing member opposes the lock release member in such a manner that the lower section prevents a lock releasing movement of the lock release member when the lower rail is deformed under a load of a vehicle crash; and
an auxiliary deformation restraining member, the auxiliary deformation restraining member including a lower part fixedly attached to the lower rail, and an upper part opposing an intermediate section of the unlock preventing member from below.

8. The vehicle seat according to claim 7, wherein the auxiliary deformation restraining member is made of stamp formed sheet metal, and wherein the lower part of the auxiliary deformation restraining member includes a lower horizontal piece fixedly attached to a lower side of the lower rail, and the upper part of the auxiliary deformation restraining member includes an upper horizontal piece, the auxiliary deformation restraining member further including an intermediate part extending along a lateral side of the lower rail.

9. The vehicle seat according to claim 7, wherein an intermediate section of the unlock preventing member is bent in a shape of letter U turned sideways in front view, and the upper horizontal piece of the auxiliary deformation restraining member opposes a lower side of the intermediate section of the unlock preventing member.

10. A vehicle seat, including:
a lower rail fixedly secured to a floor of a vehicle;
an upper rail engaged by the lower rail so as to be slidable along a lengthwise direction;
a seat cushion fixedly secured to the upper rail;
a seat back connected to a rear end part of the seat cushion;
a lock mechanism for normally locking the upper rail relative to the lower rail;
a lock release member associated with the lock mechanism for selectively unlocking the upper rail relative to the lower rail; and
a deformation restraining member formed by bending a metallic rod and fixedly attached to the lower rail or a frame of the seat cushion, and extending toward a part of the lower rail or the upper rail so as to define a small gap relative to the lower rail or the upper rail.

11. The vehicle seat according to claim 10, wherein the lower rail is fixedly attached to the floor via a bracket, and the deformation restraining member includes a first part fixedly connected to the bracket, and a second part opposing a lower side of the lower rail.

12. The vehicle seat according to claim 11, wherein the first part includes a pair of fore and aft pieces extending in a fore and aft direction and fixedly secured to the bracket at one ends thereof while the second part includes a lateral piece extending between other ends of the fore and aft pieces, the lateral piece being positioned adjacent to the lower side of the lower rail so as to define the small gap relative to the lower rail.

13. The vehicle seat according to claim 10, wherein the deformation restraining member includes an upper section fixedly attached to the frame of the seat cushion, and a lower section opposing an upper side of the lower rail.

14. The vehicle seat according to claim 13, wherein the upper section is formed by two terminal ends of the metallic rod while the lower section is formed by a semi-circular section of the metallic rod.

15. The vehicle seat according to claim 13, further comprising an auxiliary deformation restraining member, the auxiliary deformation restraining member including a lower part fixedly attached to the lower rail, and an upper part opposing an intermediate section of the deformation restraining member from below.

16. The vehicle seat according to claim 15, wherein the auxiliary deformation restraining member is made of stamp formed sheet metal, and
   wherein the lower part of the auxiliary deformation restraining member includes a lower horizontal piece fixedly attached to a lower side of the lower rail, and the upper part of the auxiliary deformation restraining member includes an upper horizontal piece, the auxiliary deformation restraining member further including an intermediate part extending along a lateral side of the lower rail.

17. The vehicle seat according to claim 15, wherein an intermediate section of the deformation restraining member is bent in a shape of letter U turned sideways in front view, and the upper horizontal piece of the auxiliary deformation restraining member opposes a lower side of the intermediate section of the deformation restraining member.

* * * * *